United States Patent
Ely et al.

(10) Patent No.: US 7,606,909 B1
(45) Date of Patent: Oct. 20, 2009

(54) METHOD AND APPARATUS FOR A BUSINESS CONTACT CENTER

(76) Inventors: Michael Ely, 26 Jennifer Dr., Pelham, NH (US) 03076; Timothy P. Sipsey, 945 Riverside Dr., Unit 7A, Methuen, MA (US) 01844; Calvin D. Adams, 9 Luann La., Pelham, NH (US) 03076; Robert Opiela, 11 Stonepost Cir., Raymond, NH (US) 03077

(*) Notice: Subject to any disclaimer, the term of this patent is extended or adjusted under 35 U.S.C. 154(b) by 1296 days.

(21) Appl. No.: 10/081,560

(22) Filed: Feb. 20, 2002

Related U.S. Application Data

(60) Provisional application No. 60/270,662, filed on Feb. 20, 2001.

(51) Int. Cl.
| | |
|---|---|
| G06F 15/16 | (2006.01) |
| G06F 15/173 | (2006.01) |
| G06F 9/46 | (2006.01) |
| G06Q 10/00 | (2006.01) |
| H04Q 7/20 | (2006.01) |
| H04M 11/00 | (2006.01) |
| H04M 15/00 | (2006.01) |

(52) U.S. Cl. .......... 709/227; 709/204; 709/218; 709/225; 709/235; 709/249; 718/105; 705/5; 379/93.09; 379/93.12; 455/452.2; 455/453

(58) Field of Classification Search ........ 709/203, 709/204, 218, 223–229, 235, 249; 718/104, 718/105; 705/5; 379/93.09, 93.12, 114.07; 455/452.2, 453
See application file for complete search history.

(56) References Cited

U.S. PATENT DOCUMENTS

| | | | |
|---|---|---|---|
| 5,452,348 A | 9/1995 | Adams et al. | |
| 5,555,179 A | 9/1996 | Koyama et al. | |
| 5,568,544 A | 10/1996 | Keeler et al. | |
| 5,634,006 A * | 5/1997 | Baugher et al. ............. | 709/228 |

(Continued)

FOREIGN PATENT DOCUMENTS

EP  0 817 451 A2  1/1998

(Continued)

OTHER PUBLICATIONS

Heffernan, A. "Protection of BGP Sessions via the TCP MD5 Signature Option," RFC 2385, Aug. 1998, pp. 1-6.*

(Continued)

*Primary Examiner*—Larry D Donaghue
*Assistant Examiner*—Melvin H Pollack

(57) ABSTRACT

A business contact center for interfacing customers with a business is described. The business contact center includes a plurality of media handlers and a conference controller. Each of the plurality of media handlers includes a corresponding control link. Each of the plurality of media handlers is configurable via the corresponding control link to define a plurality of media services including at least one of; routing media between selected media endpoints, recording media from a selectable media source, and playing selectable media to a selected media endpoint. The conference controller is coupled with each of the plurality of media handlers via the corresponding control link. The conference controller is responsive to a customer contact to configure via the corresponding control link an available one of the plurality of media handlers to define selected ones of the media services, media sources and media endpoints for handling the customer contact.

20 Claims, 11 Drawing Sheets

U.S. PATENT DOCUMENTS

| | | | |
|---|---|---|---|
| 5,673,080 | A | 9/1997 | Biggs et al. |
| 5,689,553 | A | 11/1997 | Ahuja et al. |
| 5,737,321 | A | 4/1998 | Takahashi |
| 5,745,642 | A * | 4/1998 | Ahn .................... 386/95 |
| 5,765,033 | A | 6/1998 | Miloslavsky |
| 5,884,037 | A * | 3/1999 | Aras et al. ............... 709/226 |
| 5,926,539 | A | 7/1999 | Shtivelman |
| 5,946,387 | A | 8/1999 | Miloslavsky |
| 5,953,332 | A | 9/1999 | Miloslavsky |
| 5,953,405 | A | 9/1999 | Miloslavsky |
| 5,963,547 | A | 10/1999 | O'Neil et al. |
| 5,991,276 | A | 11/1999 | Yamamoto |
| 6,002,760 | A | 12/1999 | Gisby |
| 6,018,360 | A | 1/2000 | Stewart et al. |
| 6,021,428 | A | 2/2000 | Miloslavsky |
| 6,038,302 | A | 3/2000 | Burok et al. |
| 6,044,145 | A | 3/2000 | Kelly et al. |
| 6,044,368 | A | 3/2000 | Powers |
| 6,046,762 | A * | 4/2000 | Sonesh et al. .......... 348/14.11 |
| 6,067,357 | A | 5/2000 | Kishinsky et al. |
| 6,081,513 | A | 6/2000 | Roy |
| 6,108,711 | A | 8/2000 | Beck et al. |
| 6,122,364 | A | 9/2000 | Petrunka et al. |
| 6,138,139 | A | 10/2000 | Beck et al. |
| 6,141,053 | A * | 10/2000 | Saukkonen ............ 375/240.01 |
| 6,167,395 | A | 12/2000 | Beck et al. |
| 6,170,011 | B1 | 1/2001 | Beck et al. |
| 6,173,053 | B1 | 1/2001 | Bogart et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,192,121 | B1 | 2/2001 | Atkinson et al. |
| 6,195,697 | B1 * | 2/2001 | Bowman-Amuah ......... 709/224 |
| 6,252,886 | B1 * | 6/2001 | Schwager et al. ........... 370/443 |
| 6,320,956 | B1 * | 11/2001 | Cherry ............... 379/265.02 |
| 6,343,321 | B2 * | 1/2002 | Patki et al. ................. 709/227 |
| 6,345,305 | B1 | 2/2002 | Beck et al. |
| 6,353,929 | B1 * | 3/2002 | Houston .................... 725/20 |
| 6,366,658 | B1 * | 4/2002 | Bjornberg et al. ....... 379/221.08 |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,424,709 | B1 | 7/2002 | Doyle et al. |
| 6,466,980 | B1 * | 10/2002 | Lumelsky et al. ........... 709/226 |
| 6,516,350 | B1 * | 2/2003 | Lumelsky et al. ........... 709/226 |
| 6,526,041 | B1 | 2/2003 | Shaffer et al. |
| 6,614,781 | B1 * | 9/2003 | Elliott et al. ............. 370/352 |
| 6,640,248 | B1 * | 10/2003 | Jorgensen ................ 709/226 |
| 6,732,156 | B2 | 5/2004 | Miloslavsky |
| 6,751,297 | B2 * | 6/2004 | Nelkenbaum ........... 379/88.13 |
| 6,798,786 | B1 * | 9/2004 | Lo et al. .................... 370/468 |
| 6,820,133 | B1 * | 11/2004 | Grove et al. ............... 709/238 |
| 6,862,622 | B2 * | 3/2005 | Jorgensen ................ 709/226 |
| 6,862,623 | B1 * | 3/2005 | Odhner et al. ............ 709/226 |
| 6,879,582 | B1 * | 4/2005 | Dhara et al. ............. 370/352 |
| 6,922,411 | B1 * | 7/2005 | Taylor ..................... 370/401 |
| 6,937,612 | B1 * | 8/2005 | Mauger et al. ............ 370/465 |
| 6,941,380 | B2 * | 9/2005 | Cunningham ............. 709/235 |
| 6,970,935 | B1 * | 11/2005 | Maes ..................... 709/230 |
| 6,978,247 | B1 * | 12/2005 | Bogart et al. .................. 705/8 |
| 6,985,576 | B1 * | 1/2006 | Huck ................... 379/265.09 |
| 6,990,195 | B1 * | 1/2006 | LeBlanc et al. ......... 379/406.08 |
| 7,051,111 | B1 * | 5/2006 | Scullin ..................... 709/232 |
| 7,068,680 | B1 * | 6/2006 | Kaltenmark et al. ........ 370/469 |
| 7,096,260 | B1 * | 8/2006 | Zavalkovsky et al. ....... 709/223 |
| 7,106,850 | B2 * | 9/2006 | Campbell et al. ....... 379/265.09 |
| 7,123,608 | B1 * | 10/2006 | Scott et al. ................ 370/353 |
| 7,137,126 | B1 * | 11/2006 | Coffman et al. ............. 719/328 |
| 7,145,898 | B1 * | 12/2006 | Elliott ..................... 370/352 |
| 7,165,041 | B1 * | 1/2007 | Guheen et al. ............... 705/26 |
| 7,218,722 | B1 * | 5/2007 | Turner et al. ........... 379/221.02 |
| 7,233,980 | B1 * | 6/2007 | Holden et al. .............. 709/219 |
| 7,266,613 | B1 * | 9/2007 | Brown et al. ............... 709/235 |
| 7,457,279 | B1 * | 11/2008 | Scott et al. ................ 370/352 |
| 2001/0036174 | A1 * | 11/2001 | Herring .................... 370/352 |
| 2003/0055974 | A1 * | 3/2003 | Brophy et al. .............. 709/227 |
| 2003/0061338 | A1 * | 3/2003 | Stelliga .................... 709/224 |

FOREIGN PATENT DOCUMENTS

| | | |
|---|---|---|
| WO | WO97/42728 A2 | 11/1997 |
| WO | WO98/13974 A1 | 4/1998 |
| WO | WO98/13995 A1 | 4/1998 |
| WO | WO98/17048 A1 | 4/1998 |

OTHER PUBLICATIONS

Schulzrinne, H. "RTP Profile for Audio and Video Conferences with Minimal Control," RFC 1890, Jan. 1996, pp. 1-18.*

Yavatkar, R. et al. "SBM (Subnet Bandwidth Manager): A Protocol for RSVP-based Admission Control over IEEE 802-Style Networks," RFC 2814, May 2000, pp. 1-60.*

Richards, C. and Smith, K. "The PPP Bandwidth Allocation Protocol (BAP) and The PPP Bandwidth Allocation Control Protocol (BACP)," RFC 2125, Mar. 1997, pp. 1-24.*

Shin, Jitae et al. "Dynamic QoS Mapping Control for Streaming Video in Relative Service Differentiation Networks," European Transactions on Telecommunications, vol. 12, No. 3, May-Jun. 2001, pp. 217-230.*

Alegria, Carlos A. et al. "Current Trends in Access and Transport Architectures for Business Customers," Bell Labs Technical Journal, vol. 1, Issue 1, Jul. 1996, pp. 78-87.*

Cidon, I. et al. "A Distributed Control Architecture of High-Speed Networks," IEEE Transactions on Communications, vol. 43, Issue 5, May 1995, pp. 1950-1960.*

Cidon, I. et al. "Bandwidth Management and Congestion Control in plaNET," IEEE Communications Magazine, vol. 29, Issue 10, Oct. 1991, pp. 54-64.*

Amir, Elan et al. "An Active Service Framework and its Application to Real-Time Multimedia Transcoding," Proceedings of the ACM SIGCOMM Conference on Applications, Technologies, Architectures, and Protocols for Computer Communication, 1998, pp. 178-189.*

Reininger, D. et al. "Soft QoS Control in the WATMnet Broadband Wireless System," IEEE Personal Communications, vol. 6, Issue 1, Feb. 1999, pp. 34-43.*

A DataBeam Corporation White paper, H.323 Version 2.0, A primer on the H.323 Series Standard, pp. 1-16.

A DataBeam Corporation White paper, t.120, A Primer on the T.120 Series Standard, pp. 1-16.

Lucent Technologies, Inc., IP Exchange systems, Bringing Together All Your Communication on a Single Network, Oct. 1998.

XP-000777437 Fernand hollevoet, "The Any-Media Call Centre," Brussels, Belgium.

XP-000784128 Norbert Hahn, "Dialog via Internet Call Center," Berlin.

* cited by examiner

410 – Event Handler

| Context | Queue | | Hold/Transfer | |
|---|---|---|---|---|
| | Video | Audio | Video | Audio |
| Cust Supt | File 1 | File 10 | File 21 | File 30 |
| Tek Supt | File 2 | File 12 | File 22 | File 32 |

700 / 702 / 704 / 706 / 708

414 – Agent Managment

| Agent | IP | Status | | Dept |
|---|---|---|---|---|
| Bert | w.x.y.z | Log In | Available | Cust Serv |
| Carol | w.x.y.z | Log In | On Call | Tek Supt |
| Ernest | w.x.y.z | Log Out | N/A | Cust Serv |

710 / 712 / 714 / 716 / 718

404 – Call Management

| Cnf | Context | Members | | | Ev Last | Ev Next | Status |
|---|---|---|---|---|---|---|---|
| 1 | Cust Sup | Carol | Ag 1 | Supr | Supr In | Supr Out | Done |
| 2 | Tek Supt | Caller 2 | Ag 2 | | Ag in | Ag Out | In Proc |
| 3 | Cust Sup | Caller 3 | | | Play | Ag In | Done |

720 / 722 / 724 / 726 / 728 / 730 / 732 / 734

416 – IP Bandwidth

| IP | kbps |
|---|---|
| N1 | 50000 |
| DMH1 | 1000 |
| Ag 1 | 500 |

736 / 738

418 – Conference Allocation

| IP | DMH | Bw Mx | Bw Est | CMax | CAct |
|---|---|---|---|---|---|
| IP1 | 1 | 2000 | 5000 | 200 | 45 |
| IP2 | 2 | 1000 | 4000 | 200 | 22 |
| IP3 | 3 | 0 | 4500 | 200 | 0 |

740 / 742 / 744 / 746 / 748 / 750

422 – Media Handler

| MH | Status | IP Ext | IP Int | Cf Mx | Port Stack |
|---|---|---|---|---|---|
| 1 | Up | w.x.y.z | w.x.y.z | 200 | |
| 2 | Up | w.x.y.z | w.x.y.z | 200 | |
| 3 | Up | w.x.y.z | w.x.y.z | 200 | |

754 / 756 / 758 / 760 / 762 / 764

448 – Connections

| Cnf | Call | Call IP | Ctr Pt | Out Ports | Status | MH IP | In Ports | MH Status |
|---|---|---|---|---|---|---|---|---|
| 1 | Carol | w.x.y.z | 1867 | #,#,# | Open | w.x.y.z | #,#,# | Open |
| 1 | Andy | w.x.y.z | 1868 | #,#,# | Open | w.x.y.z | #,#,# | Open |
| 1 | Super | w.x.y.z | 1869 | #,#,# | Open | w.x.y.z | #,#,# | Close |

780 / 782 / 784 / 786 / 788 / 790 / 792 / 794 / 796

444 – Default Capabilities

| | Video | kbps | Audio | kbps | Data | kbps |
|---|---|---|---|---|---|---|
| 1 | H.263 | 350 | G.711 | 55 | T.120 | 10 |
| 2 | H.261 | 350 | G.723 | 68 | | |

768 / 770 / 772 / 774 / 776 / 778 / 780

CONFERENCE CONTROLLER

FIG. 7

Routing Table (516)

| Cnf | Call | Call IP | Out Ports | Status | In Ports MH | Status | Sw/Mix | Seq|Ti |
|---|---|---|---|---|---|---|---|---|
| 1 | Carol | w.x.y.z | #,#,# | Open | #,#,# | Open | | |
| 1 | Andy | w.x.y.z | #,#,# | Open | #,#,# | Open | | |
| 1 | Super | w.x.y.z | #,#,# | Open | #,#,# | Close | | |

800 802 804 806 808 810 812 814 816

Play Table (526)

| Cnf | Call | Call IP | Out Ports | File | Status | Seq|Ti |
|---|---|---|---|---|---|---|
| 1 | Carol | w.x.y.z | #,# | Demo1 | Open | |
| 1 | Andy | w.x.y.z | #,# | Demo1 | Open | |

820 822 824 826 828 830 832

Multi-Point Data (546)

| Cnf | Call | Call IP | Out Ports | Status | MH IP | In Ports MH | Status |
|---|---|---|---|---|---|---|---|
| 1 | Carol | w.x.y.z | 1503 | Open | w.x.y.z | 1503 | Open |
| 1 | Andy | w.x.y.z | 1503 | Open | w.x.y.z | 1503 | Open |
| 1 | Super | w.x.y.z | 1503 | Open | w.x.y.z | 1503 | Close |

840 842 844 846 848 850 852 854

Recorder (566)

| Cnf | Call | Call IP | In Port Rec | Status | Destination |
|---|---|---|---|---|---|
| 1 | Carol | w.x.y.z | # | Open | Andy |

860 862 864 866 868 870

Sequencer (506)

| Cnf | Call | Call IP | Out Ports | Seq|Ti |
|---|---|---|---|---|
| 1 | Carol | w.x.y.z | #,#,# | |
| 1 | Andy | w.x.y.z | #,#,# | |
| 1 | Super | w.x.y.z | #,#,# | |

880 882 884 886 888

Media Handler

FIG. 8

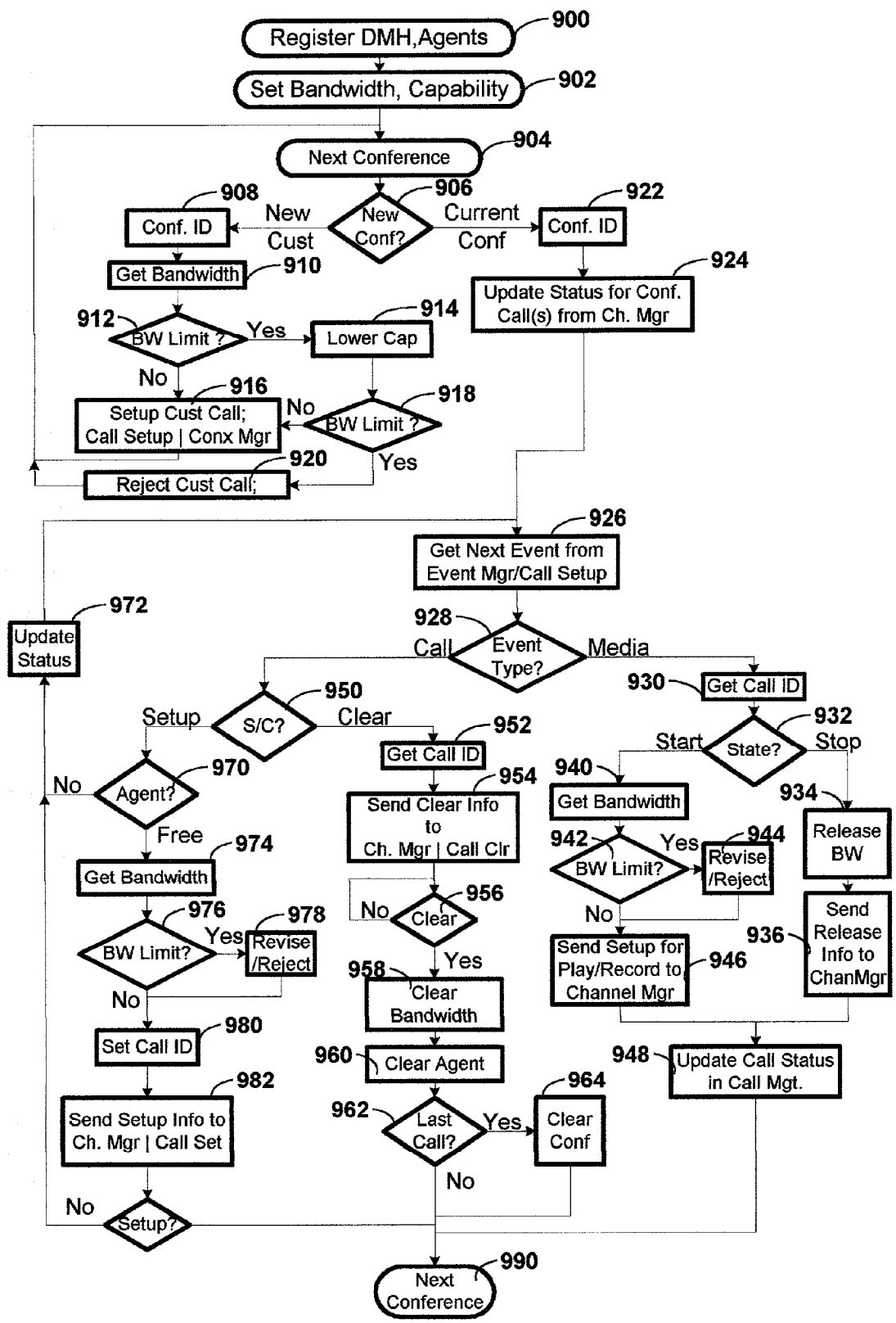
FIG. 9  Conference Manager

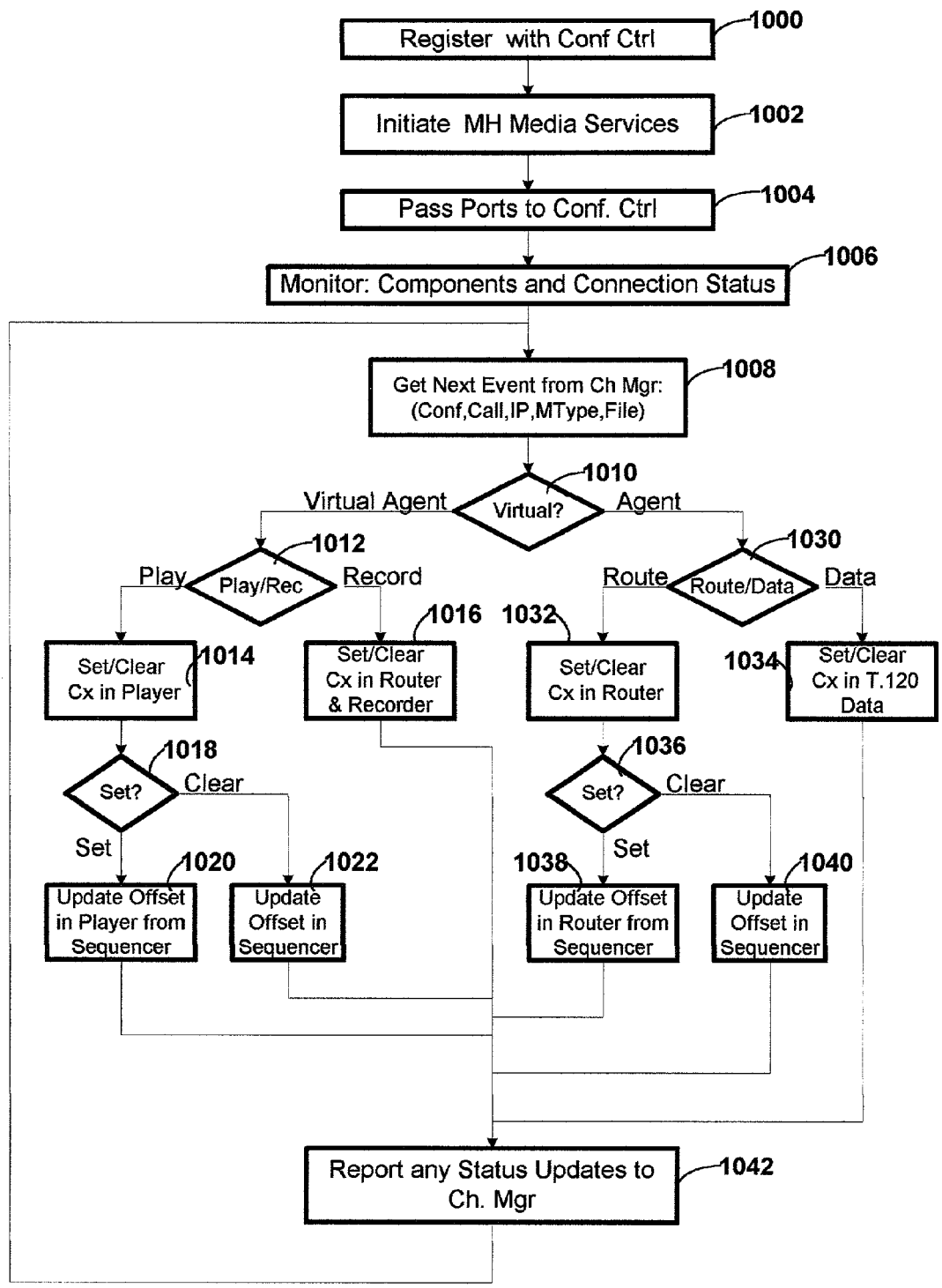
FIG. 10    Media Handler

AGENT

METHOD AND APPARATUS FOR A BUSINESS CONTACT CENTER

CROSS-REFERENCE TO RELATED APPLICATION

This application claims priority from Provisional Application No. 60/270,662, entitled "Distributed Media Controller" filed on Feb. 20, 2001 which is incorporated herein by reference in its entirety.

NOTICE REGARDING COPYRIGHTED MATERIAL

A portion of the disclosure of this patent document contains material which is subject to copyright protection. The copyright owner has no objection to the facsimile reproduction by any one of the patent document or the patent disclosure as it appears in the public Patent Trademark Office file or records, but otherwise reserves all copyright rights whatsoever.

BACKGROUND OF THE INVENTION

1. Field of the Invention

This invention generally relates to telecommunication systems. More specifically, the invention relates to a system and method for providing a business contact center over a packet-based network.

2. Description of the Related Art

Businesses place the utmost emphasis on close contact with and focus on their customers. Traditionally that contact has involved the telephone for interfacing a customer with various departments in the business. The telephone and telecommunications companies use circuit switched technology to run voice communications over a communication path commonly identified as a public switched telephone network (PSTN). There are a limited range of options for contacts between a customer and business via a traditional PSTN phone. A customer can select with a touch tone pad a call queue to wait in, and they can be informed of the remaining time before their call will be accepted. When the customer is finally connected they may or may not be coupled to the proper department or employee within the business. The contact is not always productive for the customer. For the business considerable expense in terms of employee hours and equipment is involved in providing even this level of service to a customer.

While many business devote enough resources to handling contacts with customers equipped with phones, few exploit the high bandwidth and rich media capabilities of the communication devices with which many customers are now equipped. This generation of customers is equipped with communication devices including computers, cell phones and personal digital assistants. When customers contact a business with these communication devices they are handled in the same fashion as audio only customers.

What is needed is a more flexible model for handling contacts between a business and its customers.

SUMMARY OF THE INVENTION

The present invention provides a business contact center for interfacing customers with a business. The business contact center includes a plurality of media handlers and a conference controller. Each of the plurality of media handlers includes a corresponding control link. Each of the plurality of media handlers is configurable via the corresponding control link to define a plurality of media services including at least one of: routing media between selected media endpoints, recording media from a selectable media source, and playing selectable media to a selected media endpoint. The conference controller is coupled with each of the plurality of media handlers via the corresponding control link. The conference controller is responsive to a customer contact to configure via the corresponding control link an available one of the plurality of media handlers to define selected ones of the media services, media sources and media endpoints for handling the customer contact.

In an embodiment of the invention the conference controller includes a bandwidth manager for balancing relative loads among the various media handlers.

In an embodiment of the invention the conference controller includes an event handler for determining a next media event for a customer contact based on a correlation between pre-defined call contact states and status and actual call status.

In an embodiment of the invention the business contact center includes a variety of human agents each with different skill sets. In this embodiment of the invention the conference controller includes an agent manager for determining agent availability, for matching an available agents skill set with a given customer contact, and for allowing agent control of some aspects of the configuration of the associated media handler via a control link between the agent and the conference controller.

In an embodiment of the invention the media handler includes a call sequencer for maintaining consecutive sequence numbers in the real time protocol (RTP) packets presented to a customer from a variety of media sources and human agents during a contact session.

BRIEF DESCRIPTION OF THE DRAWINGS

The present invention will be readily understood by the following detailed description in conjunction with the accompanying drawings, wherein like reference numerals designate like structural elements, and in which:

FIG. 7 shows data structures maintained in an embodiment of the invention by the software blocks of the conference controller shown in FIG. 4.

FIG. 8 shows data structures maintained in an embodiment of the invention by the software blocks of the media handler shown in FIG. 4.

FIG. 9 is a process flow diagram of the processes associated in an embodiment of the invention with the conference manager shown in FIG. 1.

FIG. 10 is a process flow diagram of the processes associated in an embodiment of the invention with the media handler shown in FIG. 1.

DETAILED DESCRIPTION OF THE INVENTION

Figure 1:
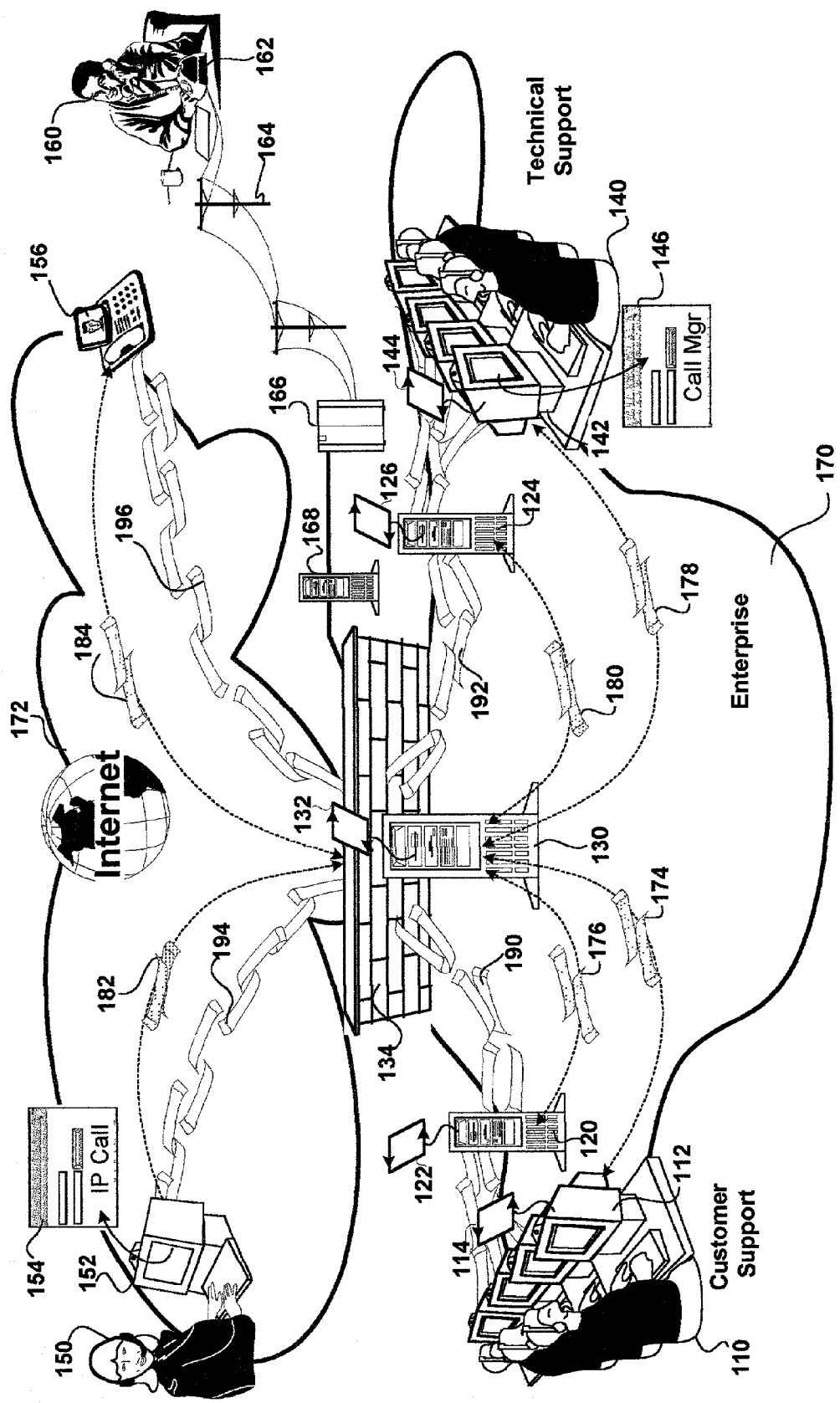
FIG. 1 shows a plurality of customers communicating with a business via a conference controller which handles call setup and selection of a multimedia handler to handle multimedia processing associated with a customer contact.

The present invention provides a method and apparatus for a business contact center. FIG. 1 shows an embodiment of the business contact center of the current invention. In the embodiment of the invention shown in FIG. 1, the business contact center services customers coupled via a variety of packet and circuit switched networks with the business contact center. Customer 150 is shown coupled to packet based network 172 via a communication device. In the example shown that device is a computer 152 enabled with both Internet Protocol (IP) telephony and multimedia support. Another communication device, i.e. a multimedia phone 156 is also shown coupled to the network 172. Customer 160 is shown coupled via a circuit switched network, i.e. a public switched telephone network (PSTN), with the business contact center. Specifically, the customer has a PSTN phone 162 which couples via subscriber lines 164 with a central office 166 with a computer telephony interface (CTI) 168 or other gateway which converts the customers circuit switched call to packets for communication with the business center.

The business contact center couples via a firewall 134 with the above discussed customers and their associated devices. The business contact center includes in this embodiment of the invention: a conference controller 130 and a plurality of media handlers 120, 124 coupled to one another on a packet based network 170. The conference controller handles contact setup, session management and selection of media handlers and media services resident thereon. A media handler includes one or more media services such as: media routing, media play, multi-point application share, and media recording. Media routing allows a caller to be coupled with an agent or another media service. The media player includes a plurality of audio and video media sources, e.g. files. The media recorder includes audio or video recording capability and may additionally include e-mail forwarding of the recorded file to the appropriate agent. The multi-point data capability allows application or data sharing between callers for training or other purposes. Once a media handler is dedicated to a session, it operates under the ongoing control of the conference controller to present various audio, data, and video media services to the caller. As a session progresses, the media services presented to the caller are determined by the conference controller using event based logic resident thereon. The business logic specifies for various call contexts, e.g. customer support or technical support, the associated business logic that should apply during a session under the various conditions that may occur during a session. Those events may include coupling the caller to any one or more of the media services on the media handler. Using the media router service the caller may be coupled to an agent selected on the basis of skill set and availability by the conference controller. The agent may in turn initiate presentment of various media services to the caller as well as traditional call functions such as transfer, hold or conference using the control link between the agent and the conference controller.

The conference controller 130 and the media handlers 120, 124 exchange session control information with control packets 176, 180 respectively. Complementary control processes 132 and 122, 126 determine the operation of the conference manager and media handlers respectively. The media services provided by the media handler such as media recording and playback may be sufficient to handle customer contact session, in which case the session will be completed without involvement of a human agent. Alternatively, a session may develop in a manner which requires that a customer be coupled to an agent. The conference manager utilizes agent availability and skill set as criteria for determining which agent to couple with a customer.

An agent 110 in customer support and an agent 140 in technical support are shown. Each agent is equipped with communication devices with varying degrees of multimedia capability. In the embodiment shown, agents 110 and 140 couple with network 170 via Internet Protocol (IP) telephony and multimedia enabled computers 112 and 142. In the embodiment shown each agent computer also includes agent control processes 114, 144 for allowing agents 110 and 140 respectively to pass control packets 174, 178 to the conference manager. Using a GUI 146 displayed on computer 142, the agent 140 can send control information via the control packets to the conference manager to effect the events associated with the session. The agent may request any media service from the associated media handler. The agent may also request call transfer to another available agent, call hold, or conference with another agent, e.g. a supervisor agent. These requests are acted on by the conference manager which passes the appropriate control information to the associated media handler and where necessary sets up the call with the appropriate agent/supervisor in the case of a conference.

The control packets associated with call setup and call clear, e.g. packets 176-184, pass between the caller's or agent's associated communication device and the conference manager 130. Control packets 174, 178 provide a control interface between the conference controller and the corresponding one of the agent communication devices 112, 142 respectively. Control packets 176, 180 provide a control interface between the conference controller and the corresponding one of the media handlers 120, 124. Media packets 190-196 provide a media interface between the corresponding media handler and a customer or agent communication device.

Once a call is setup all media, audio, video, data and associated packets, e.g. media packets 190-196, flow between the selected media handler and the associated participants. Participants in a session may range from a single caller interfacing with the media services such as media player on the selected media handler to a plurality of caller(s) and agent(s) interfacing with one another on audio, video and data links maintained via the selected media handler.

Call setup may provide context information utilized by the conference manager in determining which event based logic to apply to the subsequent session. For example, in FIG. 1 the customer 150 is shown initiating a call via a web page 154 with an embedded link which initiates a call contact from the customer's IP telephony application to the IP address of the business center. The IP address or information contained in the call setup request may additionally include call context information, indicating what department within the business, e.g. customer support or technical support, should handle the call. For example if the web page is a technical support document from the business' or a $3^{rd}$ party's web site, the embedded link may be tagged with call context information such as "technical support". That information will be passed to the conference manager portion of the business center during call setup along with device capability information, such as video, audio, and data codec support provided by the communication device.

A caller or an agent may establish and conduct a call via any of a variety of communication devices including but not limited to: a PSTN phone, a pager, an IP phone, a cell phone, an IP enabled personal digital assistant (PDA), an IP telephony and a multimedia enabled computer, etc. The business contact center is compatible with both wired and wireless networks. In an embodiment of the invention the business contact center supports contacts via e-mail, chat, voice mail, voice messaging, IP and PSTN telephony etc.

In alternate embodiments of the invention the media handler: may include additional media services including but not limited to: messaging, chat, and database access. In alternate embodiments of the invention the media player may include interactive multimedia files, e.g. interactive voice response (IVR). In alternate embodiments of the invention the business center may be used to couple employees of a business to various departments of the business or enterprise without any outside customer involvement. In this embodiment the employees are the customers of the associated department such as technical support.

Additional advantages of the business contact center which will be set forth in greater detail in the following drawings and associated text include: complex business contact management using programmable business logic, offloading of processing intensive media codecs to distributed media handlers, transparency of media transfers from a caller perspective i.e. no need to reset caller endpoint to receive from a different source, ease of enterprise firewall management with a single external IP address used to handle all incoming calls, and bandwidth management of a firewall, a network or a sub-network.

Figure 2B:
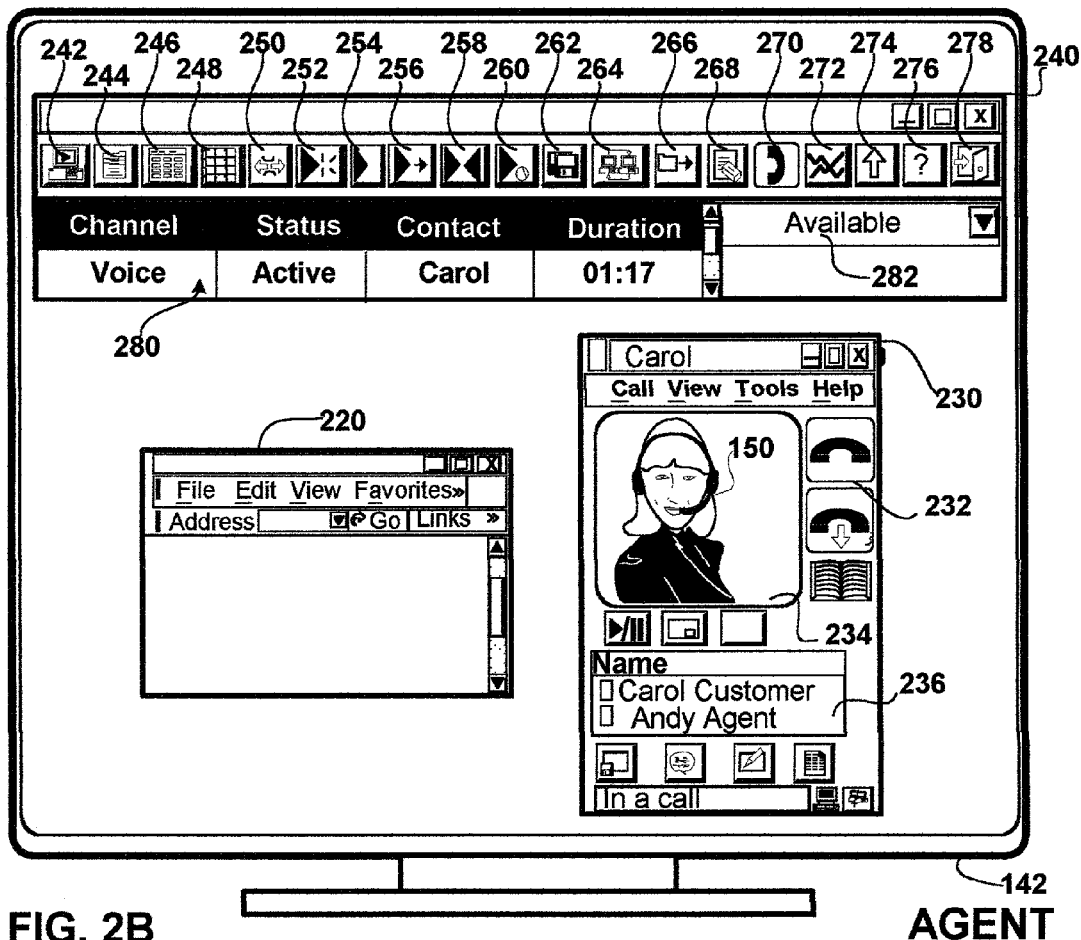
FIGS. 2A-B show graphical user interfaces associated with a multimedia customer contact on a representative one of the agent and customer communications devices shown in FIG. 1.
Figure 2A:
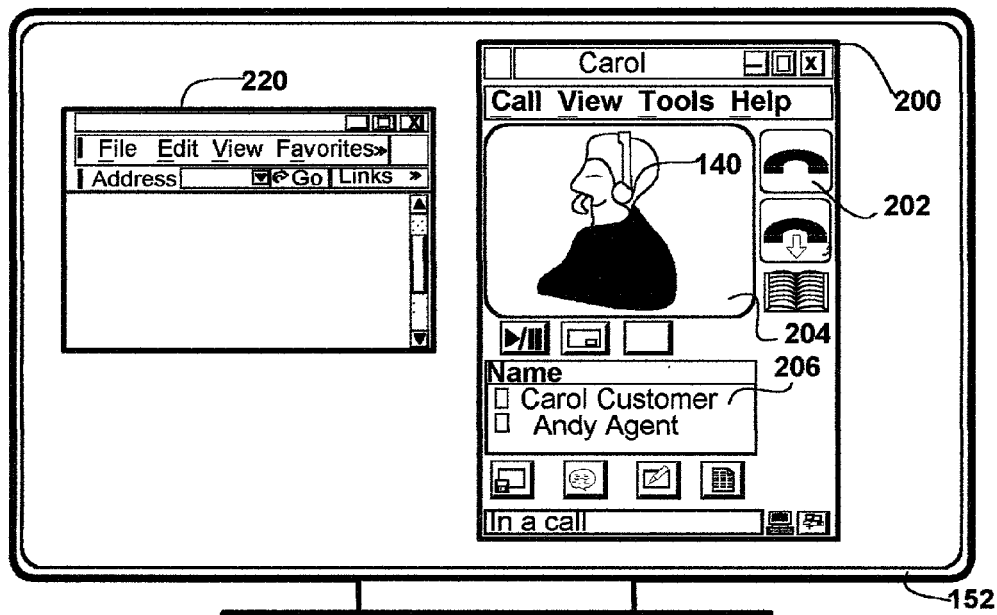

FIGS. 2A-B show graphical user interfaces associated with a multimedia customer contact on a representative one of the agent communication devices 142 and customer/caller communications devices 152 respectively as shown in FIG. 1. The displays are those associated with a session which has progressed to a point where the caller is connected to a human agent. In the embodiment shown, both customer and agent have an Internet conferencing application, e.g. NetMeeting by Microsoft of Redmond Wash. This application supports IP telephony, multi-point data conferencing, text chat, whiteboard, file transfer as well as point-to-point audio and video.

FIG. 2A shows the customer's 150 computer 152 in which two windows are displayed. The first window 200 is the graphical user interface (GUI) of the IP telephony application which includes: an icon for call setup 202, a list of call participants 206, and a thumbnail display 204 of the agent 140 to whom the customer is talking. The second window 220 is an application shared on the customers and agents display, for purposes of training or technical support for example.

FIG. 2B shows the agent's 140 computer 142 in which three windows are displayed. The first window 230 is the graphical user interface (GUI) of the IP telephony application which includes: an icon for call setup 232, a list of call participants 236, and a video display 234 of the customer 150 to whom the agent is connected. The second window 220 is the application shared on the customers and agents display, for purposes of training or technical support for example. The third window 240 is the agent control window which includes a toolbar provided by agent control processes 144 which links the agent to the conference manager for auxiliary control of the contact session. The toolbar includes icons for sending a variety of control requests to the conference manager including: a history icon 242 for requesting display of context information for historical and current contacts; a contact icon 244 for requesting display of the agent's contact list; a wrap up icon 246 for requesting that an agent be put in a wrap up mode to finish serving a contact, a touch tone icon 248 for requesting display of a keypad for dialing a number; a disconnect icon 250 for requesting disconnect of a contact; an initiate contact icon 252 for requesting a new contact in an existing or new session; a hold icon 254 for requesting that a selected contact be placed on hold; a transfer icon 256 for requesting transfer of a selected contact to another agent or supervisor; a conference icon 258 for requesting that another agent or supervisor be included in a session; a conference mute icon 260 for muting the agent's end of a conversation; a response icon 262 for displaying agent's response libraries with suggested responses for various situations; a web share icon 264 for opening a web page to initiate browser application sharing with the other participants; a file transfer icon 266 for requesting that a selected file be transferred to a selected contact; a clear whiteboard icon 268 for requesting the erasure of marks from a shared web page or application window; an IP phone icon 270 for determining whether the agent's IP phone is registered or unregistered; a statistics icon 272 for requesting statistics on the agent's performance; a supervisor hotline icon 274 for requesting a contact with the agent's supervisor; a help icon 276 for requesting help information; a logout icon 278 for requesting the log out of an agent; and a silent monitor icon (not shown) which appears on the toolbar of a supervisor and not an agent and allows the supervisor to select agents which the supervisor can monitor undetected. The agent control window also includes a drop down list 282 showing the current state of the agent. The agent control window also includes a session list 280 which shows the parameters for all calls in a session. The parameters may include: channel i.e. how the contact arrived such as via e-mail, voice or Web chat; status, i.e. active, hold, mute, pending or waiting; contact ID such as phone number or e-mail address; and duration of time the contact has been assigned to and on hold with the agent.

As discussed above, the agent may conduct a session with devices other than H.323 IP phones. These communication devices include: session initiation protocol (SIP) phones, wireless access protocol (WAP) enabled devices such as cell phones and personal digital assistants. A customer may initiate a session via e-mail, chat or messaging with communication devices which support only those capabilities.

Figure 3:
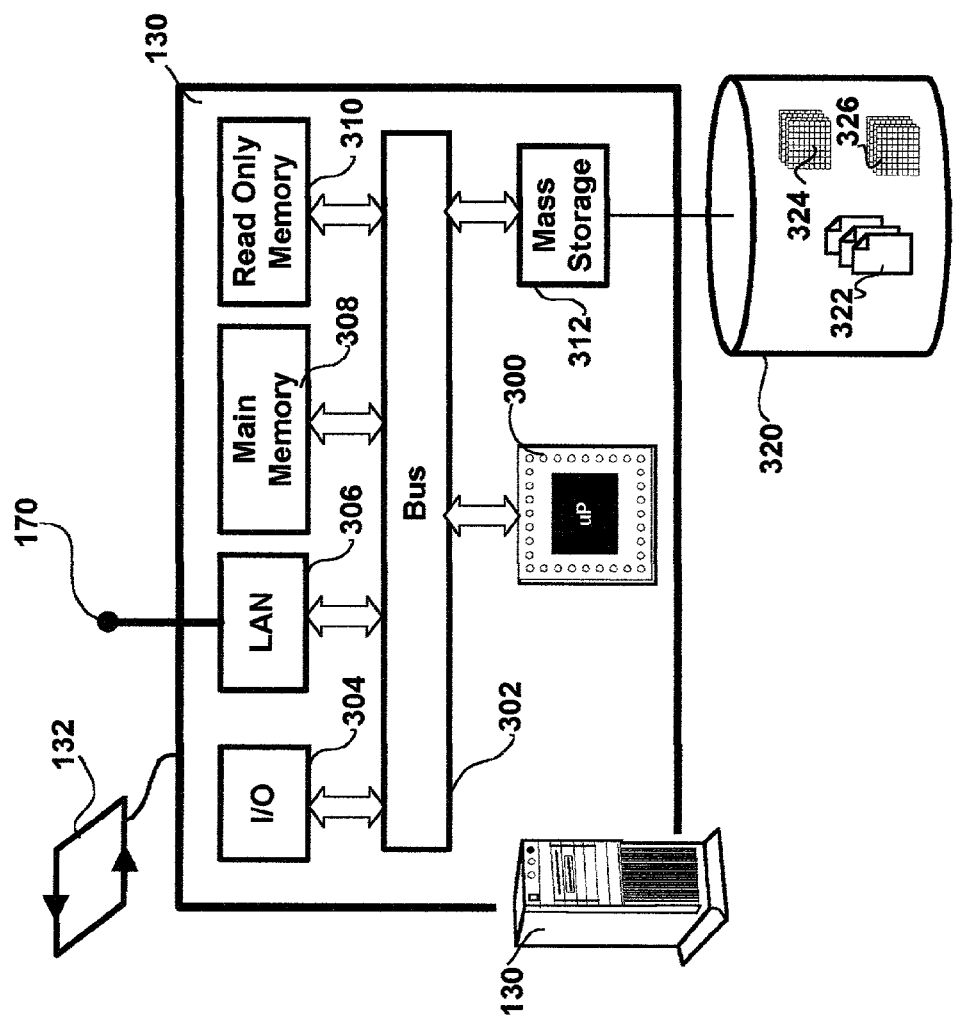
FIG. 3 is a hardware block diagram of an embodiment of the conference controller shown in FIG. 1.

FIG. 3 is a hardware block diagram of an embodiment of the conference controller 130 shown in FIG. 1. The same architecture may be present in the media handlers. A processor 300 is shown coupled via a bus 302 with: an input output (I/O) module 304 for coupling to keyboard and monitor for example; a local area network (LAN) module 306 for coupling the conference controller to a packet based network; a main memory module 308 with random access memory (RAM) for volatile storage of data and or instructions; a read only memory (ROM) module 310 for non-volatile storage of boot or other basic input output system (BIOS) code; a mass storage module 312 for interfacing with a hard drive 320 or other storage media. On the storage media associated with the conference controller the operating system 326, the conference controller program code 324 and associated tables 322 are stored.

Figure 4:
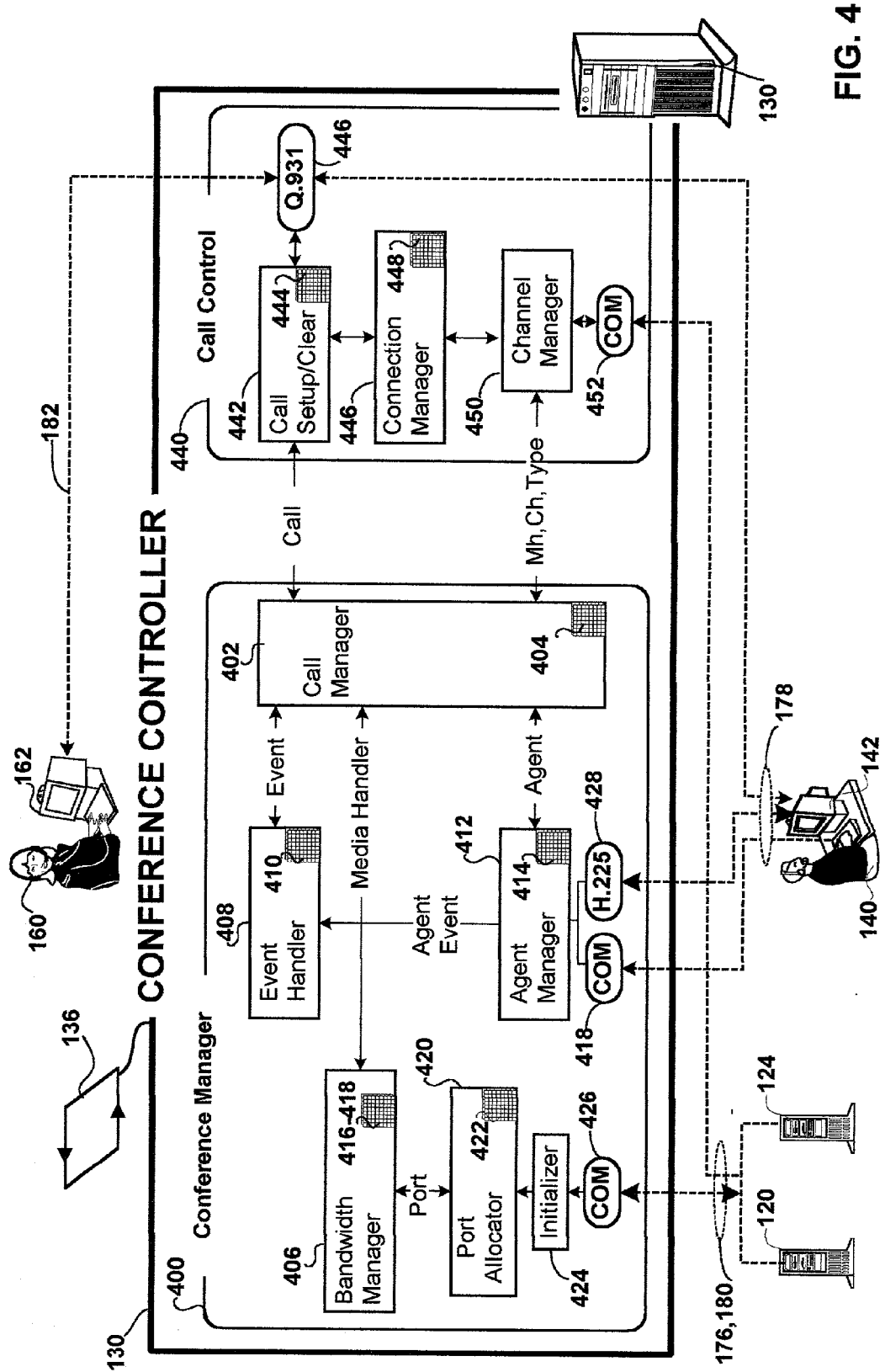
FIG. 4 is a software block diagram of an embodiment of the conference controller shown in FIG. 1.

FIG. 4 is a software block diagram of an embodiment of the conference controller shown in FIG. 1. The conference controller includes a conference manager module 400 and a call control module 440. The call control module generally handles call setup and call clear using the control portions of an standardized protocol stack for multimedia packet based standard such as H.323 Draft v4 *"Series H: Audio Visual and Multimedia Systems . . . Packet-based multimedia communication systems"*. ITU-T by the Telecommunication Standardization Sector of the International Telecommunication Union (ITU) on November 2000. That protocol stack specifies H.245 and more specifically Q.931 as the appropriate standard for call setup, capability determination and call clear. The call control module 440 handles these functions as well as responsibility for control communications with the media handlers 120, 124 shown in FIG. 1. The conference manager manages: calls, events, agents, load balancing and bandwidth management for each conference and the calls within it. The conference manager also handles agent registration via communications compliant with the H.225 portion of the H.323 protocol stack.

The call control module 440 includes the call clearance and setup module 442, the connection manager 446, and the channel manager 450. The call setup and clearance module handles call setup including capabilities negotiation during which audio, video and data capabilities and codecs are determined. A Q.931/H.245 control interface 446 is provided for this function. This interface 446 may also support other multimedia packet setup protocols such as Session Initiation Protocol (SIP). Call setup or Call clear requests are passed from this module to the conference manager and specifically the call manager 402 therein when received from either customer or agent. Alternately, this module can receive call setup/clear requests from the call manager and execute those requests. Within the call setup/clear module table 444 (See FIG. 7) contains the default/preferred capabilities for the media handlers and agents to which they are coupled. The connection manager tracks connections setup by the call setup module in a connection table 448 (See FIG. 7). To setup a media channel on a DMH, the channel manager 450 passes open logical channel (OLC) information, after bandwidth approval by the bandwidth manager 406 to the associated media handler. The information transferred also includes the type of media service, media endpoints, and media sources, e.g. audio or video files. Status information is passed back from each of the media handlers via the channel manager to the call manager and the connection manager. This information includes, status of media handler, media services, and media channels. In the embodiment of the invention, the channel manager couples to the media handlers via a component object model (COM) or other packet based control connection. This connection allows the channel manager to interface with the media handler processes for media service and channel setup and status parameters related thereto.

The conference manager 400 includes the call manager 402, the event manager 408, the agent manager 412, the bandwidth manager 406, the port allocator 420, the initializer 424 as well as any administrative module (not shown) required to setup default parameters within any of the modules of the conference manager. The initializer 424 has a COM link 426 with the media handlers 120, 124. During initialization of the conference controller the media handlers and the initializer discover one another and the initializer directs the media handlers to initialize themselves and to report back the number of calls, media services, codecs supported, bandwidth and allocated port ranges and internal and external IP addresses. Where a firewall is implemented, all media handlers may have a common external IP address thus simplifying firewall management and bandwidth control. The initializer passes the allocated ports for each media handler to the port allocator which maintains a push-pop stack for the ports of each media handler. The port stacks and remaining information obtained from each media handler that is registered with/by the initializer is stored in the media handler table 422 maintained by the port allocator. The bandwidth manager handles media handler allocation at the start of a conference setup in response to a request from the call manager. The bandwidth manager makes this selection based on either or both network bandwidth limits or media handler call limits. Selection results in load balancing among the media handlers. The bandwidth manager has a bandwidth limit table 416 which contains administratively established bandwidth limits for any IP address, or masked portion thereof. Bandwidth limits may thereby be defined for the firewall, for individual media handlers, for networks or sub-portions thereof and for agents or departments. When the bandwidth manager receives a call setup request from the call manager it uses the capability information i.e. codec to estimate bandwidth requirements which are then compared with the current bandwidth on each media handler, the current calls on each media handler and the overall bandwidth limits for any IP addresses or masked portions thereof which it is tracking in the conference allocation table 418 (See FIG. 7). The media handler with the lowest load defined in terms of either the call and/or bandwidth constraint is selected and that tentative selection may also be subject to an additional determination as to the effect such allocation will have on the overall bandwidth limits. The bandwidth manager communicates to the call manager the IP address of the associated media handler and the assigned ports which were obtained from the port allocator. When no media handler is available the bandwidth manager causes the call manager to reject the call. When a media handler is available, but not to support all the media ports, the bandwidth manager signals the call manager that the connection is accepted but without an active video port. This limitation on the state of one or more media ports is passed by the call manager through the channel manager to the selected media handler.

The agent manager 412 tracks agent registration, availability, and skill sets, e.g. department affiliation in agent management table 414 (See FIG. 7). Agent's IP phones register with the agent manager via a registration interface 428 which may implement the H.225 registration protocol portion of the H.323 protocol stack. The agent manager responds to requests for the call manager for an available agent with an appropriate skill set by selecting such an agent when available from the agent management table and updating the table accordingly. In an embodiment of the invention the agent manager also includes a COM or other packet based control interface 418 for accepting agent requests for media handler services and call management. These are initiated by agent selection of a corresponding icon on the agent control window 240 shown in FIG. 2B. The agent manager passes these requests to the event handler.

The event handler 408 includes business logic administratively entered which documents desired and conditional events for various types of sessions, e.g. a customer support session, or a technical support session. These events may include media services or call connection in the appropriate order, and sequence, and subject to the appropriate conditions. An embodiment of such logic is exhibited in event handler table 410 (See FIG. 7). Each change in session status is relayed by the call manager to the event handler. Upon receipt the event handler checks the call or conference state against the associated business logic to determine what events are triggered thereby. The event handler determines the next media event based on a correlation between pre-defined call contact states and status in the table 410 and actual call status as relayed by the call manager. The event handler may auto trigger events based on elapsed time since requesting a corresponding event. The event handler also receives agent manager requests and passes these to the call manager along with any related preceding or succeeding events which the requests trigger in the business logic to the call manager. Detailed processes associated with the conference manager 400 are set forth in the following FIG. 9 and accompanying text.

Figure 5:
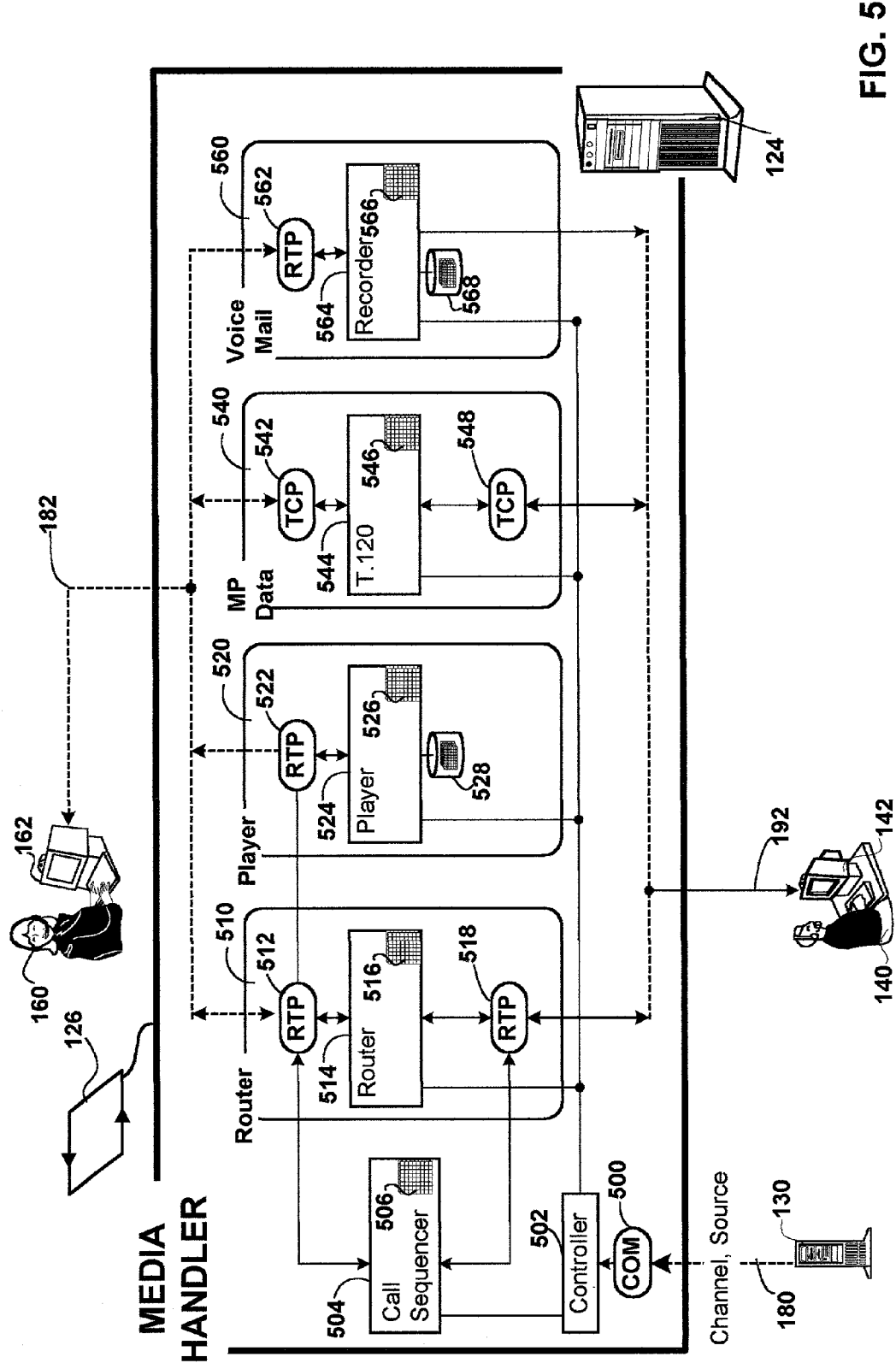
FIG. 5 is a software block diagram of an embodiment of a representative one of the media handler shown in FIG. 1.

FIG. 5 is a software block diagram of an embodiment of a representative one of the media handlers shown in FIG. 1. The media handler includes a controller 502 a call sequencer 504 and media services including a router 510, a player 520, a multi-point data service 540 and a voice mail service 560. The controller interfaces via a COM or other suitable packet control interface 500 with the conference controller 130 and specifically the initializer 424 during media handler startup/setup and with the channel manager 450 throughout active operation (See FIG. 4). The controller passes status information on each connection, maintained by each media service to the channel manager during each session. The controller also relays session setup, and channel setup/clear information from the channel manager to the appropriate media service throughout a session. The call sequencer maintains sequence information for each outbound channel from the media handler. This information includes for the real time protocol (RTP) packets generated by the router or player for example the last sequence number, the last time stamp, time interval and offset for the last audio, video or data packet sent to a given outbound IP address and port. By maintaining an offset for each IP address and port the sequencer is able to assure that as agents or events dictate, a switch of a caller or agent between one media service and another that the RTP packets will for any given outbound IP address and port contain consecutive sequence numbers within each packet even as media services providing the packets are switched. Thus throughout a session, a given caller port will receive RTP packets with consecutive and increasing sequence numbers even though media services, sources may be switched during a session. When a media service or source is switched, the sequence number of the first RTP packet for the new service is incremented by an offset equal to the last sequence number of the last RTP packet sent by the prior service plus one. The RTP timestamp may also be incremented by the actual time elapsed since the last RTP packet was sent from the prior media source. This assures that legacy media handling systems on the caller or agents will not receive non consecutive RTP packets. Thus the switch of the media service coupled to a given customer or agent port is transparent to the receiving participant.

The router media service 510 includes RTP interfaces 512 and 518 for handling routed media streams; the routing tables 516 for which are maintained by the router 514. The entries in the routing table are received from the channel manager 450 (See FIG. 4) via the controller 502. The router service handles routing of media streams from agent and caller or between caller and a number of agents. The router also handles routing of a call to another media service such as the recorder. The router also handles mixing of the audio portion of a multi-party conference. Where there is a bandwidth constraint the channel manager may signal the router to implement the multi-party conference with a switched audio channel. In this mode the router will determine in any given interval which one of the three or more participants audio packets exhibits the greatest amplitude. The packet with the greatest amplitude will be routed to the other parties. This cuts down on the bandwidth required for the audio tracks during a multi-party conference.

The media player service 520 includes an RTP interface 522 for handling media played by the player 524 which includes support for a number of audio or audio and video codecs within the H.323 or other IP telephony protocol stack including audio codecs G.711, G.723, G.7xx and video codecs H.261 and H.263. The media player sets up and tears down media services based on channel control information received via the controller 502 from the channel manager 452 (See FIG. 4). Allocated connections between a given media file stored in memory 528 and a caller and or agent are stored along with status information in the play table 526.

The multi-point data service 540 includes TCP interfaces 542 and 548 for handling multi-point data streams between participants listed in the multi-point data table 546 of the T.120 module 544. This module implements the T.120 portion of the media handler. This provides services such as application sharing to conference participants. The entries in the multi-point data table are received from the channel manager 450 (See FIG. 4) via the controller 502.

The voice mail service 560 includes an RTP interface 562 for handling media received from the caller or other participant. This information is recorded by the recorder with the appropriate audio or video codec and stored in a corresponding file in memory 568. The recorded file may then be passed via e-mail to an appropriate agent. The media player sets up and tears down recorder services based on channel control information received via the controller 502 from the channel manager 452 (See FIG. 4). Allocated connections between a given caller and the recorder are stored along with status information in the recorder table 566.

In an embodiment of the invention, each of the media services monitors channel setup and status and reports back corresponding status information via the controller to the channel manager. This information is passed by the channel manager to the call manager 404 (See FIG. 4) for use in managing the session.

Figure 6:
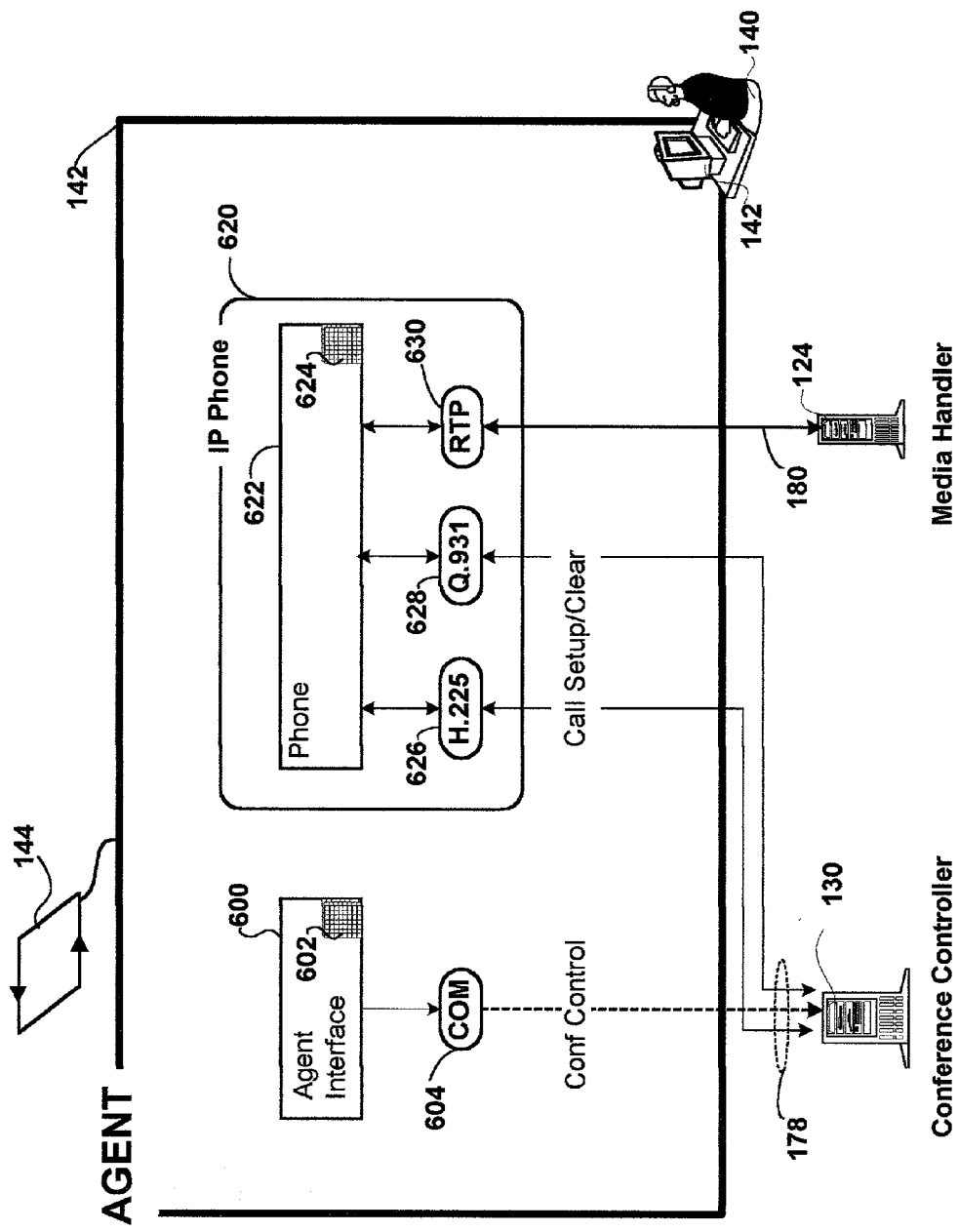
FIG. 6 is a software block diagram of an embodiment of an agent communication device shown in FIG. 1.

FIG. 6 is a software block diagram of an embodiment of an agent communication device shown in FIG. 1. The agent communication device in the embodiment shown in FIG. 6 contains an IP phone module 620 and an agent interface module 600. The IP phone module contains a phone module which maintains call information in table 624. The IP phone module contains interfaces 626-630 for implementing the H.225 registration, Q.931 setup, and RTP portions respectively of the H.323 protocol stack. Registration and setup is implemented between the agent and conference controller 130. RTP connection is maintained between the agent and selected media handler. The agent interface 600 contains the GUIs 602 by which agent requests are entered and passed over the control interface 604 via a COM or other packet based control link to the conference controller 130 and specifically the agent manager 412 therein (See FIG. 4).

FIG. 7 shows data structures maintained in an embodiment of the invention by the software blocks of the conference controller shown in FIG. 4. The event handler table 410 exhibits for an embodiment of the invention the business logic associated with two call contexts, i.e. a customer calls for which the appropriate context is customer support business logic and customer calls for which the appropriate context is technical support. Column 700 contains the context, columns 702-704 the appropriate audio and video files for the media player service of the associated media handler to play if an agent is not available initially to take the call; and columns 706-708 the appropriate audio and video files to play when and if a call transfer is made between agents during a contact session. When call status is communicated by the call manager 402 (See FIG. 4) to the event handler 408 (See FIG. 4), the event handler matches the status to the associated context and state within the context, e.g. Customer support context and agent not currently available. This results in the two media files one audio and one video being presented by the event handler to the call manager for establishing the next event for the session. If the bandwidth manager determines there is a bandwidth constraint, the call manager will direct the media handler to play the audio file rather than the video since less bandwidth is required.

The agent management table 414 is shown with agent alias in column 710, agent internal IP address in column 712, agent status in column 714, and availability in column 716, and agent skill set or department in column 718. The agent manager 412 (See FIG. 4) maintains this table via communications directly with the agents over the H.225 and COM interfaces 428, 418 respectively as well as through communications from the call manager. When an agent releases themselves from a session via the COM link the agent manager updates their status accordingly. When an agent hangs up their IP phone the call clear received over the Q.931 interface 446 of the Call setup/clear module 442 is passed to the call manager which correlates the associated agent using the call management table 404. This information is then passed to the agent manager resulting in an update of the status of the agent in the agent management table 414. When the call manager determines on the basis of an agent request, that a call setup event to an agent is appropriate for a session, the agent manager responds with the name and IP address of an available agent with the appropriate skill set, e.g. customer service. When a connection to the agent is made, the status of the agent is updated accordingly.

The call manager 402 maintains the call management table 404 which includes rows which identify for each call: the conference/session identifiers 720, the context 722, the members in columns 724-728, the last event 730, the next event 732 and the status 734 of the last event. The call manager updates status as control communication is received from each associated media handler via the COM interface with the channel manager 450 (See FIG. 4). When status is updated the call manager queries the event handler for the next event for each session. Bandwidth constraints such as switch vs. mixed selection for the audio channel for a call may also be documented in the call management table.

The IP bandwidth table 416 is administratively set up in the bandwidth manager 406 (See FIG. 4). This table contains rows in which IP address, or sub-net IP address 736 is correlated with a bandwidth limit 738. The conference allocation table 418 is maintained by the bandwidth manager. It includes bandwidth information for each of the media handlers identified by name 742, by IP address 740, by maximum bandwidth 744, by current estimated bandwidth 746, by maximum conferences 748 and by current actual conferences 750. As the call manager establishes that a call is to be setup or cleared, the appropriate bandwidth and call information is added or removed from the associated media handler's bandwidth. The bandwidth manager determines for call setup which of the media handlers will be used to handle the call and result any session. The bandwidth manager selects media handlers in a manner which balances the load of the contacts among all the media handlers. The bandwidth manager estimates the bandwidth required for a call based on the codec established for the call by the call setup/clear module 442. If the added bandwidth requirements exceed the availability for a media handler or impact broader bandwidth limits set for the network or firewall in table 416 the bandwidth manager may reject the call or inform the call manager that the call can be handled but with limited media support, i.e. with only an active audio channel, as opposed to audio and video. If the call manager accepts the media constraint than channel setup parameters sent to the media handler exhibit the bandwidth constraint.

The port allocator 420 obtains the parameters in the distributed media handler table 422 via the initializer 424 which handles activation and registration of media handlers. That table contains for each registered media handler: the name 754; status 756; external IP address 758; internal IP address 760; maximum calls and or bandwidth 762 and ports. The ports are maintained in stacks for each media handler and are popped from the stack in response to a request from the bandwidth manager when a new call is setup for a selected media handler. Conversely when a call is cleared the ports are brought back to available status by pushing them back on the stack for the associated media handler. By associating all media handlers with a common external IP address 758 and distinctive internal IP addresses 760 the management of the firewall 134 (See FIG. 1) may be simplified. The connections table 448 is maintained by the connection manager 446 and records for each connection the: conference id 780, the participant's name and IP address 782-784 respectively; the control port 786 for the connection; the outbound ports and port status 788-790, i.e. the media ports of the participants IP phone that the media handler should send packets to; the inbound ports of the media handler, i.e. ports that the participant's IP phones should send to; and status thereof 792-794 respectively, and such additional information as capability.

The default capability table 444 is administratively setup on the call setup and call clear module 442. This table contains rankings or preferences 768 among supported video codecs 770, audio codecs 774, and multi-point data codecs 778 with corresponding estimated bandwidths 772, 776 and 780 for each connection supporting same. This bandwidth estimate is passed by the call manager to the bandwidth manager in order to determine bandwidth requirements and availability for each requested connection.

FIG. 8 shows data structures maintained in an embodiment of the invention by the software blocks of the media handler shown in FIG. 5. The routing table 516 is maintained by the media router service 510 shown in FIG. 5. It contains for each route the: conference/session ID 800, the participant name 802, IP address 804 out bound media ports 806 from the media handler to the participant and status 808 thereof; the inbound ports 810 of the media handler and status 812 thereof; the bandwidth constraint applied to the route e.g. switched vs. mixed on the audio port; and sequence parameters 816 of the last RTP packet for each outbound media port. When a route to a port is not the first media service provided for a session to that port the sequence parameter will be initialized with an offset obtained from the call sequencer 504 (See FIG. 5). This assures transparency at an RTP packet level for media service switches during a session to a particular participant. Sequence numbers remain consecutive even when a new media service is coupled to an outbound port. Out bound ports are the ports of the participant to which the media handler is sending data, video, or audio.

The play table 526 is maintained by the media player service 520 (See FIG. 5) and includes conference ID 820, participant name 822, IP address 824, outbound ports 826, filename 828, status 830 and sequence parameters 832.

The multi-point data table 546 is maintained by the multi-point data service 540 (See FIG. 5) and contains for each route the: conference/session ID 840, the participant name 842, IP address 844 outbound media ports 846 from the media handler to the participant and status 848 thereof; the IP address 850 of the media handler; the inbound ports 852 of the media handler and status 854 thereof.

The recorder table 566 is maintained by the recorder media service 560 (See FIG. 5) and includes for each recording being handled the: conference ID 860, the callers name 862, IP address 864, inbound port 866 for the recorder, status 868 and e-mail or other agent destination 870 for the corresponding recorded file created by the recorder. In an embodiment of the invention the media player may first play a recorded file with a simple prompt to leave a message, followed by a channel switch to the recorder to record the actual message.

The sequencer table 506 is maintained by the call sequencer 504 (See FIG. 5) and contains updated information on conference ID 880, caller name 882, IP address 884, outbound ports 886 and sequence parameters 888. As discussed above the sequence parameters such as sequence number are stored for the last RTP packet of any media service supplied to a session participant, either agent or caller. These sequence parameters are used to keep a standard and contiguous flow of media to an outbound IP entity when a participant is switched on a given port during the course of a session. During the course of a session a number of media services may be switchably connected to a given participant. As each new service is introduced the packets associated therewith exhibit an increasing offset which corresponds to the range of sequence numbers/timestamps utilized in the RTP packets associated with the prior media services delivered to a given participant's port(s).

FIG. 9 is a process flow diagram of the processes associated in an embodiment of the invention with the conference manager shown in FIG. 1. Processing begins with process 900 in which media handlers and agents are registered with the conference manager. Next in process 902 bandwidth limits for the media handlers and/or for selected IP addresses are established in the bandwidth manager and the default capabilities for the conference controller are administratively established in the call setup and call clear module 442 (See FIG. 4). Next control is passed to process 904 for processing of the next conference, a.k.a. session. In this embodiment of the invention the conference manager multiplexes between new and existing conferences actively managing each.

In decision process 906 a determination is made as to whether the conference is new or existing. If the conference is new control passes to process 908 in which a conference ID is established. Then in process 910 the call manager makes a request for a media handler to be allocated to the call by the bandwidth manager. The bandwidth manager determines bandwidth required for the call using the capabilities negotiated for the call by the call setup/clear module 442 (See FIG. 4). Then in decision process 912 the bandwidth manager determines whether there is a bandwidth limit that needs to be applied to this new conference/session. A partial bandwidth limit would result when all but one of the media handlers were at capacity and when that one only had capacity for an audio channel, but not enough for a video and/or data channel as well. In process 914 the lower bandwidth requirements are calculated using the codec bandwidth requirements of the audio codec negotiated with the caller. Then the lower bandwidth requirements are again tested in decision process 918 against the available bandwidth on the selected media handler. If insufficient bandwidth remains, the customer call is rejected in process 920. If sufficient bandwidth remains, the customer call is accepted in process 916 and call setup capability, caller IP address and media handler ports are passed via the call setup/clear module 442 to the caller. The caller's ports and IP address are passed to the selected media handler via the channel manager 450 (See FIG. 4). Alternately, if initially it is determined in decision process 912 that there is no bandwidth limit in the selected media handler then control passes directly to decision process 916 in which the setup information is passed to the call setup/clear module 442 and the channel manager. Control returns from either process 916 and 920 to process 904 for management of the next conference.

Where an existing conference is subject to conference management, control is passed from decision process 906 to process 922 in which the existing conference ID is determined. Then any status information received from the channel manager from the media handler associated with the conference is used by the call manager 402 (See FIG. 4) to update the status of the associated call and channel(s) thereof in the call management table 404 maintained by the call manager. These status updates might include channel open or close confirmations, media service start or completion confirmations, etc. Next in process 926 the call manager determines the next event for the conference. A next event may arise from or be triggered by an agent request presented to the event handler 408 by the agent manager 412. A next event may arise automatically where the event handler triggers the subsequent event at an interval after a prior event. An event may arise from the event handler after presentment of status updates from the call manager to the event manager. An event may also arise by a call setup or call clear command received by the call manager from the call setup/clear module 442.

In process 928 the type of event, call or media is determined. For media events such as: play, record, disconnect, or done control passes to process 930. In process 930 the call ID is determined. Then in decision process 932 the state of the event is determined. If the event is a stop event such as media play or record services "done", then control passes to process 934 in which bandwidth associated with the media player or recorder is released in the conference allocation table 418 maintained by the bandwidth manager 406. Then in process 936 corresponding control parameters are sent to the associated media service to remove the associated channel/connection information from the associated table. After bandwidth is released control passes to process 948 in which call status is updated in the call management table 404 maintained by the call manager. Control then passes via block 990 to process 904 for processing of the next conference.

Where the next event is a media start event, control passes from decision process 932 to process 940 in which the bandwidth for the event to be started is obtained. Then in process 942 the bandwidth manager 406 determines if there is a bandwidth limit that would prevent the start of the media event as specified. If control is passed to process 944, bandwidth may be lowered if possible by disabling of one or more of the channels associated with the start event. Assuming that reduction is possible and assuming it is sufficient to fall below the bandwidth limit for the associated media handler, then control is passed to process 946. In process 946 the appropriate media service setup information is sent via the channel manager to the associated media handler and the media service therein which is the subject of the start event. Alternately, if in decision process 942 there is a bandwidth limit then bandwidth is revised downward if possible to an acceptable level to enable the setup in process 946 and if not possible then the event is rejected and control returns directly to processing of the next conference in process 904. A more detailed view of the processes associated with revision or rejection of an event based on bandwidth in process 944 has been discussed above in connection with processes 914-920. Those more detailed sub steps have been omitted in process 944 for purposes of clarity.

Where the next event is a call clear event as determined in decision processes 928 and 950, control passes to process 952 in which the call id is determined. Then control passes to process 954 in which call and channel clear information is sent by the call manager 402 (See FIG. 4) to the call setup/ clear module 442 and the channel manager module 450 respectively. Once the clear is confirmed in decision process 956 control passes to process 958 in which bandwidth and ports associated with the cleared call are released by the bandwidth manager with the associated ports pushed back into the associated port stack maintained by the port allocator 420 (See FIG. 4). Then agent status is updated to available in the agent manager 412. If in decision process 962 it is determined that the call cleared is the last call then control passes to process 964 in which the conference/session is cleared from all associated tables maintained within the conference controller. In either case, control then returns via block 990 to process 904 for the processing of the next conference.

Where the next event is a call setup event control passes from decision processes 928 and 950 to decision process 970. In decision process 970 a determination is made as to whether an agent with appropriate skill set is free. Agent's in an embodiment of the invention include both humans as well as media services. If not then control passes to process 972 in which status is updated in the call management table 404 for the call setup event. Then control returns to process 926 in which the call manager updates the event handler with the new "failed" status of the last event and the next resultant event is triggered by the event handler. If an agent is determined to be available in decision process 970 then control passes to process 974.

In process 974 the bandwidth for the event to be started is obtained. Then in process 976 the bandwidth manager 406 determines if there is a bandwidth limit that would prevent the start of the call setup event as specified. If control is passed to process 978, bandwidth may be lowered if possible by disabling of one or more of the channels associated with the start event, or if that is not possible, the call will be rejected. Assuming that reduction is possible and assuming it is sufficient to fall below the bandwidth limit for the associated media handler then control is passed to process 980 in which call ID is set. A more detailed view of the processes associated with revision or rejection of an event based on bandwidth in process 944 has been discussed above in connection with processes 914-920. Those more detailed sub steps have been omitted in process 978 for purposes of clarity. After setting the call ID in process 980, control is passed to process 982. In process 982 the call manager sends appropriate setup information to the call setup/clear module 442. Setup information is also sent to the channel manager 450 for setting the control connections and opening the logical channels on the associated media handler.

FIG. 10 is a process flow diagram of the processes associated in an embodiment of the invention with the media handler shown in FIG. 1. Processing begins with process 1000 in which the media handler registers with the conference controller 130 shown in FIGS. 1,4. Then in process 1002 the media handler services are initialized. Next in process 1004 the port range of the media handler are passed to the port allocator 420 of the conference controller 130 (See FIG. 4). Monitoring of the media handler, resident media services and channels and status thereof is then initiated in process 1006. Next in process 1008 the next event from the channel manager is obtained by the controller 502 portion of the media handler 130 (See FIG. 5). That control information may include: a conference ID, a call ID, an IP address, outbound ports, inbound media handler ports, a media service type, and for selected ones of the services such as the media player, a media file name.

Next in decision process 1010 a determination is made as to the type of event. If the event pertains to an actual agent to couple to the conference, the control passes to decision process 1030. If the media event type pertains to a virtual agent for the call, e.g. a media play service or record, then control is passed to decision process 1012. In decision process 1030 an agent multi-point data event is passed to process 1034 for setting, clearing or changing the status of a corresponding channel in the multipoint data service 540. Control then passes to process 1042 in which any changes in status of the media handler, media services or connections handled thereby are passed to the channel manager 450 (See FIG. 4). Then control returns to process 1008 for the processing of the next event received from the channel manager.

If the event is for providing a media route service to an agent, then control passes from decision process 1030 to process 1032. In process 1032 setting, clearing or changing the status of a corresponding channel in the media router service 510 is performed. If the event is determined in decision process 1036 to involve the set of a route, then control passes to process 1038. In process 1038 the corresponding connection is looked up by the call sequencer to determine if the port and IP address to which the outbound route(s) are directed has been used previously during the session by this or any of the other media services. If it has the offset of the last packet of the media service previously provided to the port and IP address is used to adjust upward the initial sequence number/timestamp of the first RTP packet on the new route. If no prior RTP connection exists for the particular channel which the router sets then no offset is performed to the initial sequence number of the first RTP packet. Control then passes to process 1042 as discussed above. If alternately it is determined that a route is to be cleared then control passes to process 1040. In process 1040 the sequence number of the last RTP packet sent by the channel and cleared in process 1032 is passed to the call sequencer 504 (See FIG. 5) where it is stored with the associated channel ID, outbound port and IP address. This sequence number will be utilized in establishing the next RTP packet provided by any of the media services over the associated channel.

If the media event type pertains to a virtual agent for the call, e.g. a media play service or record, then control is passed to decision process 1012. In decision process 1012 a record media event is sent to process 1016 for setting, clearing or changing the status of a corresponding channel in the voicemail service 560 (See FIG. 5). Control then passes to process 1042 in which any changes in status of the media handler, media services or connections handled thereby are passed to the channel manager 450 (See FIG. 4) as discussed above.

If the event is for providing a media play service to an agent or customer then control passes from decision process 1012 to process 1014. In process 1014 setting, clearing or changing the status of a corresponding channel in the media player service 520 is performed. If the event is determined in decision process 1018 to involve the set of a new play channel, then control passes to process 1020. In process 1020 the corresponding connection is looked up by the call sequencer to determine if the port and IP address to which the outbound media player(s) are directed has been used previously during the session by any of the media services. If it has the offset of the last packet of the media service previously provided to the port and IP address is used to adjust upward the initial sequence number of the first RTP packet on the new media play. If no prior RTP connection exists for the particular channel which the media player service sets then no offset is performed to the initial sequence number of the first RTP packet. Control then passes to process 1042 as discussed above. If alternately it is determined that a player channel is to be cleared then control passes to process 1022. In process 1022 the sequence number/timestamp of the last RTP packet sent by the channel and cleared in process 1014 is passed to the call sequencer 504 (See FIG. 5) where it is stored with the associated channel ID, outbound port and IP address. This sequence number will be utilized in establishing the next RTP packet provided by any of the media services over the associated channel.

Figure 11:
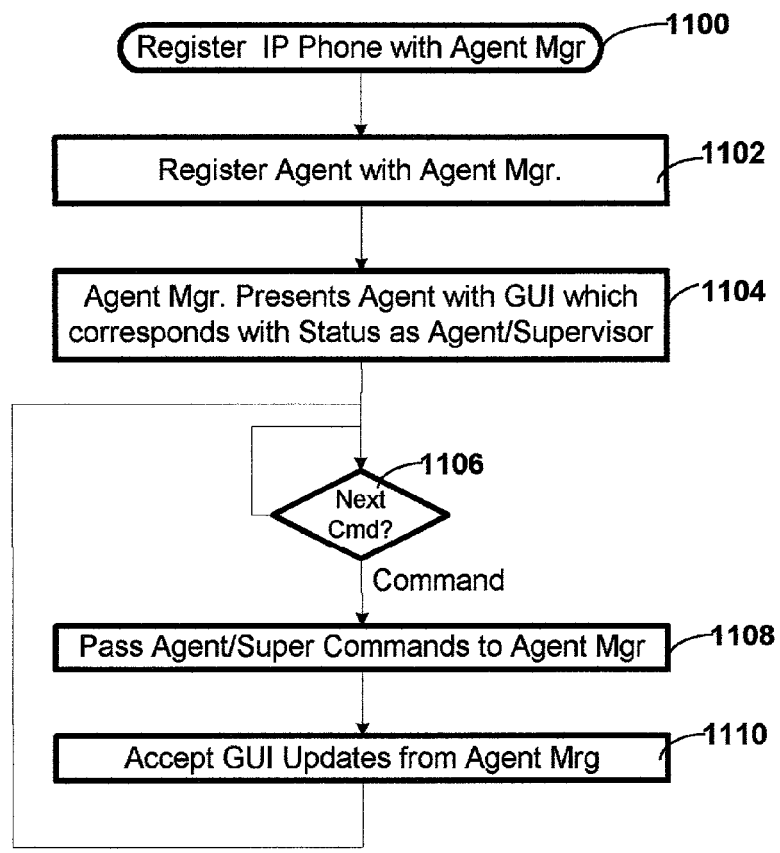
FIG. 11 is a process flow diagram of the processes associated in an embodiment of the invention with the agent device shown in FIG. 1.

FIG. 11 is a process flow diagram of the processes associated in an embodiment of the invention with the agent device shown in FIG. 1. Processing begins with process 1100-1102 in which the IP phone or telephony application and the agent register with the agent manager module 412 of the conference controller 130. Then in process 1104 the agent manager 412 presents the agent with a GUI, e.g. agent control window 240 shown in FIG. 2B. The GUI may correspond with the status of the agent as supervisor or agent. Control then passes to decision process 1106 in which the next agent request as entered via the agent control window 240 is detected by the agent interface 600 (See FIG. 6) and passed in process 1108 to the agent manager module 412 of the conference controller 130. Next in process 1110 the agent control window accepts updates from the agent manager module 412. Subsequently control returns to decision process 1106.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A business contact center for interfacing customers with a business, and the business contact center comprising:
    a plurality of media handlers each media handler including a respective dedicated control interface and each of the plurality of media handlers configurable via the control interface to define a plurality of media services to service a customer contact received at the business contact center including at least one of routing media between selected media endpoints, recording media from a selectable media source, and playing selectable media to a selected media endpoint;
    a conference controller coupled with each of the plurality of media handlers via the corresponding control interface, and the conference controller responsive to a customer contact to configure via the corresponding control interface an available one of the plurality of media handlers to define selected ones of the media services, media sources and media endpoints for handling the customer contact and to maintain a customer session under ongoing control of the conference controller through exchange of session control packets to present multiple media services to the customer, the controller including a bandwidth manager which estimates a bandwidth requirement of the customer contact in response to the customer contact and selects an available one of the media handlers based upon a lowest media handler bandwidth load.

2. The business contact center of claim 1, wherein the bandwidth manager manages media handler selection for each customer contact by comparing the bandwidth requirement to current bandwidth availability on each media handler, and by lowering the bandwidth requirement were possible by disabling one or more channels associated with the contact to enable selection if sufficient bandwidth is not available.

3. The business contact center of claim 1, wherein the conference controller further comprises:
    an event handler for determining a next media event for a customer contact based on a correlation between predefined call contact states and status and actual call status.

4. The business contact center of claim 1, further comprising:
    a plurality of agent communication devices each having a control interface coupled to a control interface of the conference controller wherein each of the plurality of agent communication devices is configurable via the corresponding control interface to couple with a selected one of the plurality of media handlers.

5. The business contact center of claim 4, wherein the conference controller further comprises:
    an agent manager coupled to each of the plurality of agent communication devices via the corresponding control interface, and the agent manager responsive to a request for customer contact with an available agent to select an available one of the plurality of agent communication devices for coupling with the corresponding one of the plurality of media handlers handling the corresponding customer contact.

6. The business contact center of claim 4, wherein each of the plurality of agent communication devices further comprises:
    an agent interface for accepting input from an agent of requests and for passing the requests to the conference controller via the control interface to manage a customer contact session.

7. The business contact center of claim 4, wherein the plurality of media handlers each further comprise:
    a call sequence interacting with selected ones of the plurality of media services defined by each media handler to maintain consecutive sequence numbers in the real time protocol (RTP) packets output from the media handler from various media sources during a customer contact session.

8. A method for interfacing customers with a business, and the method comprising:
    selecting at a conference controller an available one of a plurality of media handlers for handling a call with the calling one of the customers including estimating a bandwidth requirement for the call and basing the selecting on at least the bandwidth requirement,
    passing call parameters for handling the call with the calling one of the customers from the conference controller to the available one of the media handlers, and
    configuring the available one of the plurality of media handlers for selected ones of a plurality of media services, media sources and media endpoints for handling the customer contact, responsive to the passing of the call parameters in the passing act.

9. The method for interfacing customers of claim 8, further comprising in response to the configuring act, at least one of the following acts performed on the available one of the plurality of media handlers of:
    routing media between selected media endpoints;
    recording media from a selectable media source, and
    playing selectable media to a selected media endpoint.

10. The method for interfacing customers of claim 8, wherein the call setup parameters passed in the passing act include at least outbound media ports and a media service type and wherein the conference controller multiplexes between new and existing calls to actively manage each.

11. The method for interfacing customers of claim 8, wherein the selecting act further comprises the act of:
managing media handler selection for successive calling ones of the customers to effect a balancing of relative loads among the plurality of media handlers by comparing the bandwidth requirement to current bandwidth availability on each media handler.

12. The method for interfacing customers of claim 8, wherein the passing act further comprises the act of:
determining a next media event for the calling one of the customers based on a correlation between pre-defined call contact states and status and actual call status for the calling one of the customers; and
with the configuring act responsive to each determination in the determining act to reconfigure the available one of the plurality of media handlers.

13. The method for interfacing customers of claim 8, further comprising the act of:
managing the available one of the plurality of media handlers to define additional selected ones of a plurality of media services, media sources and media endpoints for handling the customer contact from an agent communication device configured as a media endpoint in the configuring act.

14. The method for interfacing customers of claim 8, further comprising the act of maintaining consecutive sequence numbers in the real time protocol (RTP) packets output from the available one of the plurality of media handlers from successive selected ones of the media sources configured in the configuring act during a customer contact session with the calling one of the customers by incrementing the sequence number of a first RTP packet for each new media source by an offset equal to a last sequence number of an immediately preceding media source of the successive selected media sources plus one.

15. Computer software, tangibly embodied in a computer-readable medium for interfacing customers with a business, and the software comprising instructions to perform the following operations:
selecting at a conference controller an available one of a plurality of media handlers for handling a call with the calling one of the customers including estimating a bandwidth requirement for the call and using the bandwidth requirement in the selecting;
passing call parameters for handling the call with the calling one of the customers from the conference controller to the available one of the media handlers; and
configuring the available one of the plurality of media handlers for selected ones of a plurality of media services, media sources and media endpoints for handling the customer contact to maintain a customer session presenting multiple media services to the customer under ongoing control of the conference controller, responsive to the passing of the call parameters in the passing act.

16. The software of claim 15, in which the instructions for configuring the available one of the media handlers further comprise instructions for performing at least one of:
routing media between selected media endpoints;
recording media from a selectable media source, and
playing selectable media to a selected media endpoint.

17. The software of claim 15, in which the instructions for selecting further comprise instructions for:
managing media handler selection for successive calling ones of the customers to effect a balancing of relative loads among the plurality of media handlers by comparing the bandwidth requirement to a current bandwidth availability of each media handler.

18. The software of claim 15, in which the instructions for passing further comprise instructions for:
determining a next media event for the calling one of the customers based on a correlation between pre-defined call contact states and status and actual call status for the calling one of the customers, and
with the configuring act responsive to each determination in the determining act to reconfigure the available one of the plurality of media handlers.

19. The software of claim 15, in which the instructions further comprise instructions for:
managing the available one of the plurality of media handlers to define additional selected ones of a plurality of media services, media sources and media endpoints for handling the customer contact from an agent communication device configured as a media endpoint in the configuring act.

20. The software of claim 15, in which the instructions further comprise instructions for:
maintaining consecutive sequence numbers in the real time protocol (RTP) packets output from the available one of the plurality of media handlers from successive selected ones of the media sources configured in the configuring act during a customer contact session with the calling one of the customers by incrementing the sequence number of a first RTP packet for each new media source by an offset equal to a last sequence number of an immediately preceding media source of the successive selected media source plus one.

* * * * *

UNITED STATES PATENT AND TRADEMARK OFFICE
CERTIFICATE OF CORRECTION

PATENT NO. : 7,606,909 B1  Page 1 of 1
APPLICATION NO. : 10/081560
DATED : October 20, 2009
INVENTOR(S) : Ely et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1612 days.

Signed and Sealed this

Twelfth Day of October, 2010

David J. Kappos
*Director of the United States Patent and Trademark Office*